United States Patent [19]

White et al.

[11] Patent Number: 4,477,651

[45] Date of Patent: Oct. 16, 1984

[54] PROCESS FOR PREPARING POLYPHENYLENE OXIDES

[75] Inventors: Dwain M. White, Schenectady; Susan A. Nye, Feura Bush, both of N.Y.

[73] Assignee: General Electric Company, Schenectady, N.Y.

[21] Appl. No.: 501,477

[22] Filed: Jun. 6, 1983

[51] Int. Cl.³ .............................................. C08G 65/44
[52] U.S. Cl. ..................................... 528/215; 526/65; 528/212; 528/214; 528/216; 528/217
[58] Field of Search ............... 528/212, 214, 215, 216, 528/217; 526/65

[56] References Cited

U.S. PATENT DOCUMENTS 4,092,294 5/1978 Bennett, Jr. et al. ............... 528/215

Primary Examiner—Lester L. Lee
Attorney, Agent, or Firm—Leo I. MaLossi; James C. Davis, Jr.; James Magee, Jr.

[57] ABSTRACT

A novel process is disclosed for the preparation of polyphenylene ethers by an oxidative coupling reaction. The process comprises oxidatively coupling a phenolic compound in the presence of a catalyst which comprises a copper complex of a copper compound with an N,N-disubstituted alkylene or cycloalkylene diamine having from 2 to 3 carbon atoms between the nitrogen atoms and whose substituents on the two nitrogen atoms are isopropyl or alpha tertiary alkyl, a tertiary amine, a bromine-containing compound and dimethyl amine. Unexpected short reaction times are obtained and the high molecular weight product increases in molecular weight and shows a marked decrease in bound nitrogen after moulding.

20 Claims, 3 Drawing Figures

PROCESS FOR PREPARING POLYPHENYLENE OXIDES

BACKGROUND OF THE INVENTION

The polyphenylene ethers and processes for their preparation are known in the art and described in numerous publications including Hay, U.S. Pat. Nos. 3,306,874 and 3,306,875. Other procedures are described in Van Dort, U.S. Pat. No. 3,365,422, Bennett and Cooper, U.S. Pat. Nos. 3,639,656, 3,642,699, 3,733,299, 3,838,102, 3,661,848 and 4,092,294 and Olander, U.S. Pat. No. 4,055,553. All of these patents are incorporated herein by reference.

The processes most generally used to produce the polyphenylene ethers involve the self-condensation of a monovalent phenol in the presence of an oxygen-containing gas and a catalyst.

Improved catalyst systems have been developed for the preparation of polyphenylene ethers by the oxidative coupling of 2,6-di-substituted phenolic compounds. Such systems are disclosed in above-noted U.S. Pat. No. 4,092,294. This patent discloses a catalyst which comprises a copper compound; a diamine wherein the two amino nitrogens are separated by at least two and no more than three carbon atoms and the carbon atom to which the amino nitrogens are attached is aliphatic; a tertiary amine and a bromine-containing compound selected from the group consisting of hydrogen bromide, alkali metal bromides, alkaline earth metal bromides, 4-bromophenols and mixtures thereof plus an amount of a secondary monoamine of the formula

wherein R and R' are independently selected from the group consisting of lower alkyl of from 1 to 12 carbon atoms, and preferably lower alkyl of from 3 to 6 carbon atoms.

The preferred secondary amine is di-n-butylamine (DBA). A series of runs using different secondary mono-amines are reported in U.S. Pat. No. 4,092,294 together with the reaction time required for the given system. It is shown therein that the use of two secondary amines (di-n-propylamine and diethylamine) having molecular weights lower than DBA resulted in progressively slower reaction rates as the molecular weight became smaller. Thus, the reaction rate for diethylamine was practically twice as long as the reaction time for DBA. The general teaching apparent from this data is that the lower the molecular weight of the secondary amine, the slower the reaction rate, and, therefore, the less desirable the secondary amine for the practice of the Bennett et al. invention. One of the significant advantages of the Bennett et al. invention is the effective use the practice thereof makes of the DBA, because almost all of the DBA becomes incorporated into the polyphenylene oxide (PPO). Loss of the DBA from the catalyst complex in this manner results in the generation of reactive species that can couple with each other or with other materials (e.g. rubber, high impact polystyrene, etc.) to increase the molecular weight and generate grafted products with such other materials.

Recognizably, it would be desirable to find a low cost replacement for DBA (without any significant loss in the benefits achieved) since the price of DBA and the quantity required make DBA one of the major contributors to catalyst cost. Just such an objective is unexpectedly achieved by the use of a particular secondary mono-amine in accordance with this invention.

DESCRIPTION OF THE INVENTION

The present invention is directed to an improved process for forming a polyphenylene ether resin by the oxidative coupling of a 2,6-di-substituted phenolic compound in the presence of a catalyst which comprises a copper compound, a diamine wherein the two amino nitrogens are separated by at least two and no more than three carbon atoms and the carbon atom to which the amino nitrogens are attached is aliphatic, a tertiary amine, and a bromine-containing compound selected from the group consisting of hydrogen bromide, alkali metal bromides, alkaline earth metal bromides, 4-bromophenols and mixtures thereof and a minor amount of a secondary mono-amine. The improvement comprises utilizing as the secondary mono-amine, dimethylamine (DMA).

BRIEF DESCRIPTION OF THE DRAWING

The features of this invention believed to be novel and unobvious over the prior art are set forth with particularity in the appended claims. The invention itself, however, as to the organization, method of operation and objects and advantages thereof, may best be understood by reference to the following description taken in conjunction with the accompanying drawing wherein:

MANNER AND PROCESS OF MAKING AND USING THE INVENTION

Figure 1:
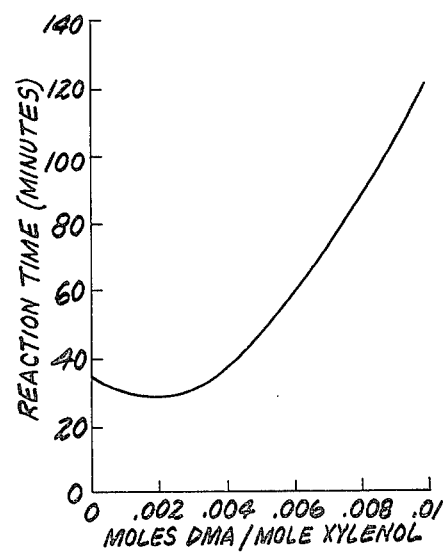
FIG. 1 provides a graphic representation of reaction time as a function of DMA added, when all of the monomer and amine is added at once (i.e. bulk addition)

The improved process of the invention is broadly applicable to the preparation of polyphenylene ethers of the formula:

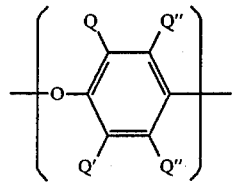

wherein Q is a hydrocarbon radical, a halogen radical having at least two carbon atoms between the carbon atom and the phenyl nucleus, and Q' and Q" are selected from the same group as Q, and in addition, halogen, provided that Q, Q' and Q" are all free of a tertiary carbon atom.

The preferred polyphenylene ethers that are prepared by the process of the invention are those wherein Q and Q' are hydrocarbon radicals having from 1 to 8 carbon atoms and Q" are each hydrogen. The especially preferred polyphenylene ethers are those where Q and Q' are methyl and each Q" is hydrogen.

Useful diamines include those of the formula:

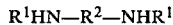

wherein each $R^1$ is independently isopropyl, a $C_{4-8}$ tertiary alkyl or a cycloalkyl group having no hydrogens on the alphacarbon atom. $R^2$ has at least two and no more than three carbon atoms separating the two nitrogen atoms and is $C_{2-4}$alkylene or $C_{3-7}$cycloalkylene and examples of these compounds include N,N'-di-t-butylethylene diamine; N,N'-di-t-amylethylenediamine and N,N'-diisopropylethylenediamine.

The tertiary amine should be one having low steric requirements. Examples of these compounds are tri-lower-alkyl amines wherein the alkyl groups are of from 1 to 6 carbon atoms such as trimethylamine or n-butyldimethylamine. In addition cyclic amines such as N-methylpyrrolidine may be employed. A preferred species is n-butyldimethylamine.

The useful 4-bromophenols include 4-bromo-2,6-disubstituted phenols such as 4-bromoxylenol and the like. The alkali metal bromides and alkaline earth metal bromides include bromides such as sodium bromide, calcium bromide and the like. Other bromides are listed in U.S. Pat. No. 3,733,299 which is hereby incorporated by reference.

Copper bromide-4-bromoxylenol solutions may be prepared for use in the practice of the invention by adding bromine to a suspension of cupric carbonate or cuprous oxide in methanol containing an excess of 2,6-xylenol. The bromine reacts with the xylenol to produce 4-bromoxylenol, the hydrogen bromide produced in this reaction converts the copper compound to a copper bromide.

In the practice of this invention the amount of DMA used per mole of monomer (i.e. 2,6-di-substituted phenolic compound) may range from about 0.001 mole DMA per mole of monomer to about 0.01 mole DMA per mole of monomer with the preferred range being from about 0.0015 mole DMA per mole of monomer to about 0.006 mole DMA per mole of monomer. The molar ratio of the tertiary amine to copper may be from 10-100 moles/g. atom of copper and preferably from 20-50 moles/g. atom of copper. The molar ratio of 2,6-di-substituted phenol to copper is from 100 to 1200 and preferably 700 to 1000. The ratio of atoms of bromine per atom of copper is from 2 to 20 preferably 3 to 10. The diamine may be employed at a ratio of 1 to 5 moles of diamine per g/atom of copper preferably 1.1 to 2.5 moles per g/atom. The particular copper compound is not critical. Useful copper compounds include cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric toluate, and the like. Preferred cuprous and cupric salts are the halides, cuprous bromide and cupric bromide being most preferred. These compounds may be prepared in situ by the reaction of bromine or hydrogen bromide with cuprous oxide or cupric carbonate.

The styrene resins are well known and will comprise at least 25% by weight of units of the formula:

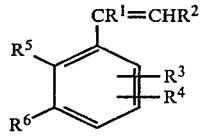

wherein $R^1$ and $R^2$ are selected from the group consisting of (lower) alkyl or alkenyl groups of from 1 to 6 carbon atoms and hydrogen; $R^3$ and $R^4$ are selected from the group consisting of hydrogen and (lower) alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred compound. Compositions of polyphenylene ethers and styrene resins are described in Cizek, U.S. Pat. No. 3,383,435 which is incorporated by reference.

The styrene resins may include units derived from a $\alpha,\beta$-unsaturated cyclic anhydride of the formula:

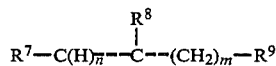

wherein the dotted lines represent a single or a double carbon to carbon bond, $R^7$ and $R^8$ taken together represents a

linkage, $R^9$ is selected from the group consisting of hydrogen, vinyl, alkyl, alkenyl, alkylcarboxylic or alkenyl-carboxylic of from 1 to 12 carbon atoms, n is 1 or 2, depending on the position of the carbon-carbon double bond, and m is an integer of from 0 to about 10. Examples include maleic anhydride, citraconic anhydride, itaconic anhydride, aconitic anhydride, and the like.

Rubber may be used in the preparation of the styrene resins to upgrade the physical properties of these resins according to well known techniques. The rubber employed may be a polybutadiene rubber, butyl rubber, styrene-butadiene rubber, acrylonitrile rubber, ethylene-propylene copolymers, natural rubber, EPDM rubbers, polysulfide rubbers, polyurethane rubbers, epichlorohydrin rubbers and the like.

The styrene resins may be homopolymers or they may comprise 40 to 1 parts by weight of the $\alpha,\beta$-unsaturated cyclic anhydride, from 60 to 99 parts by weight of a styrene compound and from 0 to 25 parts, preferably from 5 to 15 parts by weight of rubber. A preferred styrene resin is high-impact rubber-modified polystyrene. An example of a useful high-impact-rubber-modified polystyrene resin is Foster Grant 834 which contains about 8% of polybutadiene rubber.

The reaction is preferably carried out with oxygen as the oxygen-containing gas, although air and mixtures of air with inert gases may be employed. It is preferred to employ an aromatic solvent such as benzene or toluene as the reaction medium. Other solvents mentioned in the Hay patents may also be employed.

A quaternary ammonium compound is advantageously employed in the process of the invention. These compounds are of the formula:

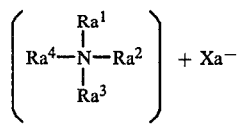

wherein $Ra^1$, $Ra^2$, $Ra^3$, and $Ra^4$ are alkyl, aralkyl, and alkenyl groups of from 1–24 carbon atoms and Xa is an anion. The preferred anions are halides such as bromine, chlorine, sulfate or phosphate.

Mixtures of the ammonium salts may also be employed as the total number of carbon atoms in the $Ra^1$, $Ra^2$, $Ra^3$ and $Ra^4$ substituents should be at least 10. The quaternary ammonium salts may be employed at a range of from 100–2000 ppm based on the organic reaction solvent, and more preferably 500–1500 ppm, based on the organic reaction solvent.

The alkyl substituents may be methyl, ethyl, propyl, butyl, hexyl, octyl, decyl, cetyl, hexadecyl and isomers thereof. Mixtures of these compounds may also be employed. The aralkyl substituent may include alkyl-mono-carbocyclic radicals having from 7 to 20 carbon atoms such as benzyl, phenethyl and the like. The alkenyl substituents include straight and branched chain unsaturated hydrocarbon atoms of from 1–24 carbon atoms which contain one or more double bonds.

The quaternary ammonium salts are well known and many are commercially available. For example, reference may be made to Kirk-Othmer Encyl. of Chemical Technology, second edition, Volume 16, pp. 859–865; Arquads, Armour Industrial Co. (1956) and Schwartz, A. M. et al, Surface Active Agents, Vol. 1, pp. 156–171 and Interscience Publishers (1949) and Vol. II, pp. 112–118 (1958), all of which are incorporated by reference. A particularly useful material available commercially under the designation Adogen 464 (Aldrich Chemical Co.) has the composition methyltrialkyl ($C_8$–$C_{10}$) ammonium chloride.

Batch polymerizations were run with the copper/diamine catalyst utilizing DBA as a reference reaction and also with other amines besides DBA. No water removal step or drying agent was used. Results obtained from these reactions in which all of the monomer and amine were added at one time at the beginning of the polymerization are set forth in Table I. The catalyst ratio employed was Cu:DBEDA:amine:DMBA;2,6-xylenol=1:2:8.5:40:900. Reaction temperatures were maintained near 35° C. except for early exotherms that often rose above 40° C. even with an ice-water bath for cooling.

TABLE I

| Reaction No. | Amine | Reaction Time (Min.) | Analysis of Product $M_w^{PSa}$ | Analysis of Product N (PPM) | Analysis After Molding $M_w^{PS}$ | Analysis After Molding N (PPM) |
|---|---|---|---|---|---|---|
| 12352-89 | Bu$_2$NH | 21 | 19,000 | | | |
| | | 28 | 74,000 | 586 | — | — |
| 12352-143 | Et$_2$NH | 33 | 21,000 | | | |
| | | 50 | 68,000 | 576 | 81,000 | 244 |
| 12493-13A | Me$_2$NH | 36 | 65,000 | 453 | 75,000 | 181 |
| 12493-15 | n-BuNH$_2$ | 36 | 20,000 | | | |
| | | 66 | 51,000 | 453 | 62,000 | 308 |
| 12493-14 | t-BuNH$_2$ | 66 | 57,000 | 412 | 73,000 | 195 |

[a]molecular weight determined by GPC using polystyrene calibration

Surprisingly, the reaction utilizing DMA was the only one with a reaction rate close to that manifest in the DBA reaction. The DMA reaction was scaled-up three-fold and several variations were tried to determine whether DMA could be used when the monomer was added slowly instead of all at once (i.e. after the initial addition of about 10% of the monomer, the balance was added over a period ranging from 15 to 30 minutes). These reactions are shown in Table II. All of the reactions were slow. Adding the DMA late in the reaction sequence (either with the xylenol during the slow addition or after the xylenol had been added) slowed the reaction considerably. Increased stirring produced little or no effect as did lowering the reaction temperature.

All of the high molecular weight products in Table I contained 400–600 ppm bound nitrogen. When these products were compression molded at 270° C. and then dissolved and precipitated with methanol, they showed an increase in molecular weight and a decrease in the amount of bound nitrogen. These properties in PPO are desirable, since such PPO materials produce blends with rubber materials given excellent impact properties.

TABLE II

| Reaction No. | Process DMA Added | Process Other Changes | Reaction Time (Min.) | Analysis of Product $M_w^{PS}$ | Analysis of Product N (PPM) |
|---|---|---|---|---|---|
| 12493-22 | Initially | | 42 | 22,000 | |
| | | | 56 | 49,000 | 389 |
| 12493-23 | Initially | Stirring Increased | 45 | 26,000 | |
| | | | 63 | 49,000 | 389 |
| 12493-24 | With 2,6-xylenol[a] | | 90 | 12,000 | |
| | | | 126 | 34,000 | 352 |
| 12493-24A | After 20 Min. | | 78 | 6,000 | |
| | | | 156 | 30,000 | 390 |
| 12493-25 | After 20 Min. | Lower Reaction Temp. (30° C.) | 157 | 37,000 | 443 |

[a](xylenol addition program: 10% initially; 90% added over 20 minute period)

In carrying out the invention by batch polymerization, a vessel equipped with a Vibromixer stirrer and oxygen inlet tube was charged with a solution of 35.7 g of 2,6 xylenol, 112 mg of di-t-butyl-ethylenediamine, 1.75 ml of dimethyl-butylamine, 0.36 ml of 10 w/v % Adogen 464 solution in toluene and 460 mg of a 27 w/w % dimethylamine solution in a total volume of 178 ml of toluene. The oxygen was set at 0.6 SCFH and 0.20 ml of a solution of 1.18 g of Cu$_2$O in 10 ml 48% HBr was added and the mixture was stirred vigorously. At the end of the polymerization, a fraction of reaction mixture was diluted with toluene and the polymer was precipitated by adding methanol dropwise. The white powder was filtered off, washed with methanol and dried overnight at 60° C. in vacuo. The polymers were reprecipitated from toluene solution with methanol and dried for nitrogen analysis.

A similar procedure was used for the other reactions in Table I except the amines were added as the pure liquids. The reactions in Table II were also run similarly except in a larger reaction vessel at three-times the scale and with only 10% of the monomer in the reaction vessel initially. The remaining monomer, dissolved in toluene, was added over a twenty minute period at a constant rate using a peristaltic pump. The DMA was added at the times indicated in Table II.

Some of the reactions were run in a series of continuous-stirred-tank-reactors (CSTR) whereby it was possible to separate aqueous phase from the system between the first and the second CSTR with centrifugation or by the use of gravity decantation. Since each CSTR in the series would under steady state conditions contain reaction mixtures of a different extent of reaction and since the extent of reaction is controlled by residence time and other reaction conditions, the water removal could be achieved at any desired extent of reaction. In utilizing the CSTR arrangement, low molecular weight PPO resin (i.e. oligomer) was first prepared in one CSTR, the aqueous phase was removed, the amine was added, and in subsequent CSTR's further oxidation of the oligomer and the residual monomer was carried on to produce higher molecular weight material. The last stage was carried out either in a batch reactor or in a series of two CSTR's. In another type of experiment, a batch polymerization was run in which the evaluated amine was added at the start and the aqueous removal step was not included.

Polymerization reactions with various amines presented in Table III were carried out in two steps. Thus, a low molecular weight reaction mixture ($\overline{M}_n \sim 800$) was prepared by the following continuous process. Monomer and normal catalyst (copper halide, DBEDA, DMBA) but no secondary monoamine were pumped into a continuous-stirred-tank reactor (CSTR) while oxygen was added and reaction mixture was drawn off and stored under nitrogen. The water of reaction was removed from the polymerization at this time; then the secondary monoamine was added and the mixture was oxygenated in a batch-type, stirred reaction vessel to allow polymerization to be resumed to produce high molecular weight products. The reaction times in Table III refer to the time for the second stage (the batch reaction) to occur.

TABLE III

| Reaction | Amine | Reaction Time | $M_w^{PSb}$ | N (ppm) | $[\eta]$ (dl/g)$^c$ |
|---|---|---|---|---|---|
| 1 | None | 2.5 Hrs. | 55,700 | 670 | .54 |
|   | [PF]$^a$ | — | [47,000] | [336] | [.53] |
| 2 | Dibutylamine | 20 Min. | 80,650 | 872 | .64 |
|   | [PF] | — | [117,000] | [600] | [.82] |
| 3 | Diethylamine | 21 Min. | 81,600 | 833 | .64 |
|   | [PF] | — | [98,000] | [368] | [.74] |
| 4 | Dimethylamine | 33 Min. | 74,000 | 769 | .62 |
|   | [PF] | — | [105,000] | [292] | [.69] |

$^a$[PF] = Evaluated as a pressed film
$^b$By GPC, using polystyrene calibration.
$^c$Intrinsic viscosity measured in chloroform @ 25° C.

The reactions in Table IV were totally continuous process systems. A low molecular weight polymer stream from the single CSTR process described above, also prepared without secondary monoamine present and dried by decanting the water of reaction, was polymerized further by pumping the mixture through two additional CSTR's in series. The monoamine (primary or secondary) was added to the first of the two CSTR's in series and oxygen was added to both of them. Residence times for the CSTR's were selected to produce a high molecular weight polymer.

TABLE IV

| Reaction | Amine | Avg. $M_w^{PSb}$ in CSTR #3 | N (ppm) | $[\eta]$ | $^{13}$C NMR$^c$ |
|---|---|---|---|---|---|
| 1 | Dibutyl Amine | 74,750 | 1040 | .58 | — |
|   | [PF]$^a$ | [91,000] | [551] | — | — |
| 2 | Diethyl Amine | 28,950 | 785 | .41 | Diethylamino Groups on End of Chain Only |
|   | [PF] | [47,550] | [250] | — | No Apparent Amino Groups |
| 3 | t-Butyl Amine | 24,600 | 700 | .32 | Evidence of Amine Incorporation on Methyl Groups |
|   | [PF] | [34,125] | [350] | [.46] | |
| 4 | Dimethyl Amine | 73,420 | — | — | — |
|   | [PF] | [81,500] | — | — | — |

$^a$[PF] = Evaluated as a pressed film
$^b$By GPC, using polystyrene calibration
$^c$Characterization by NMR in deuterochloroform The following is descriptive of the polymerization process utilized in generating the data of Tables III and IV. First, the effluent from the first CSTR was prepared and this effluent was utilized in either the batch polymerization of Table III or the continuous polymerization of Table IV.

A monomer/catalyst premix was made by mixing 6970 ml 50 w/w % 2,6 xylenol solution in toluene, 103 ml 10 w/v % di-t-butylethylenediamine solution in toluene, 159 ml (113 g) dimethylbutyl amine, 163 ml 2 w/v % Adogen 464 solution in toluene, 17.9 ml of a solution of 1.18 g of Cu$_2$O in 10 ml 48% HBr and 10,600 ml toluene. This premix was pumped into a 4 liter CSTR at a flow rate of 133 ml/min to give a residence time of 30 min. O$_2$ was set at 3.1 std. liter/min. The temperature was maintained at 38°-42° C. The effluent was collected under N$_2$ in gallon containers and used later in subsequent batch or continuous polymerizations. The separated water phase was removed by pipetting the bottom layer from the container in a dry box.

A quantity (80 g) of the CSTR #1 effluent, with the water phase previously removed, was weighed into a beaker in a nitrogen dry box. The weight of 2,6 xylenol initially in solution was determined to by 16 g. A quantity of secondary or primary amine (0.9 mole % based on xylenol) was added. The reaction mixture was stirred and added to a vessel equipped with a Vibromixer stirrer and oxygen inlet tube. The oxygen was set at 0.6 SCFH and the mixture was stirred vigorously. At the end of the polymerization, a fraction of the reaction mixture was diluted with toluene and the polymer was precipitated by adding methanol dropwise. The white powder was filtered off, washed with methanol and dried overnight at 60° C. in vacuo. The polymers were reprecipitated and dried and then analyzed for nitrogen.

In the continuous polymerization 650 g of CSTR #1 effluent, with the water phase previously removed, was weighed into a beaker in a nitrogen dry box. The weight of 2,6 xylenol was determined to be 130 g. A quantity of secondary or primary amine (0.9 mole % based on 2,6 xylenol) was added. The reaction mixture was then pumped into a reactor setup containing two CSTR's in series at a flow rate of 4.6 ml/min giving residence times of 30 and 28 minutes in CSTR's #2 and #3 respectively. Oxygen flow was 0.2 and 0.1 SCFH in #2 and #3 respectively. Samples were collected from each reactor and precipitated by adding methanol dropwise. The white powders were collected on a filter, washed with methanol and dried overnight at 60° C. in vacuo. Polymers to be analyzed for nitrogen were reprecipitated and dried before analysis.

Commercial grade 2,6 xylenol was used as received. Dimethylbutylamine, di-n-butylamine and di-t-butylethylene-diamine were distilled from barium oxide. Dimethylamine was distilled from a 40% aqueous solution and condensed with a dry ice condensor. Reagent grade diethylamine, t-butylamine, n-butylamine, cuprous oxide and 47% aqueous HBr were used without further purification.

GPC measurements were performed on a Waters Associates, Inc. liquid chromatograph, Model ALC/GPC 244, equipped with $\mu$-Styragel columns in chloroform containing 0.5% ethanol. A series of columns ($10^5$, $10^4$, $10^3$ and 500Å) was utilized at a 2.0 ml/min. flow rate. The columns were standardized with polystyrene standards and all molecular weight values are quoted relative to polystyrene. Nitrogen analysis was performed by the micro-Kjeldahl method.

In a typical run to prepare PPO using DBA the material relationship would be Cu:DBEDA:DBA:D-MBA:2,6-disubstituted phenolic compound equal to 1:2:8.5:40:900 (copper content expressed in gram atoms, all other material content in moles). The maximum value (0.01) of "moles DMA/mole xylenol" plotted in FIGS. 1, 2 and 3 would be the equivalent of 9.0 moles of DMA per 900 moles of the phenolic compound. It follows therefrom and from Table I that a reaction time approaching that obtained with DBA can be obtained using a much smaller molar quantity of DMA than the molar quantity of DBA (8.5 moles) required according to the above-noted relationship.

Figure 2:
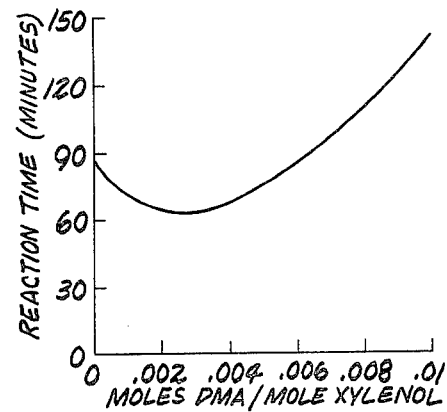
FIG. 2 is similar to FIG. 1 except that the monomer is added slowly.

The data for FIG. 1 (batch-bulk additions) is displayed in Table V. The heading "N/N(PF)" indicates that the lefthand numeral designates nitrogen content in ppm and the righthand numeral designates nitrogen content in ppm after heating to 275° C. The data for FIG. 2 is displayed in Table VI and represents batch runs in which the amine was slowly added over a period of 17 minutes. Table VII displays data utilized in FIG. 3 and was obtained from pilot plant trials in which the amine was added as in Table VI. The molecular weight of PPO obtained in both Tables V and VI was about 45,000. The values for the amount of amine added are designated in moles per gram atom of copper.

TABLE V

| Amt. of Amine | Reaction Time (minutes) | N/N (PF)[a] |
| --- | --- | --- |
| 0 DMA | 35 | 328/225 |
| 1.7 DMA | 33 | 366/208 |
| 2.5 DMA | 30 | 301/162 |
| 4.25 DMA | 45 | 522/331 |
| 8.5 DMA | 120 | 356/285 |
| 8.5 DBA | 26 | 792/413 |

[a]Evaluation of pressed film

TABLE VI

| Amt. of Amine | Reaction Time (minutes) | N/N (PF) |
| --- | --- | --- |
| 0 DMA | 87 | 415/269 |
| 1.7 DMA | 69 | 566/203 |
| 2.5 DMA | 64 | 576/304 |
| 8.5 DMA | 141 | 643/375 |
| 8.5 DBA | 42 | 794/407 |

TABLE VII

| Run # | Amt. of Amine | Reaction Time (minutes) | N[(4)] | 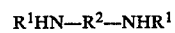(GPC) |
| --- | --- | --- | --- | --- |
| 1 | 8.5 DMA | 185 | 576 | 54,600 |
| 2 | 4.3 DMA | 73.1 | 570 | 48,000 |
| 3 | 2.2 DMA | 68.8 | 573 | 54,000 |
| 4 | 0 DMA | 105.9 | 555 | 54,000 |
| 5 | 8.5 DBA | 55.8 | 636 | 54,400 |

[(1)]Normal mole ratios of other catalyst components
[(2)]Slow addition time - 30 minutes to add 90% of monomer to catalyst mixture
[(3)]The most yellow PPO was the one made with DBA even after reprecipitation
[(4)]Nitrogen content (ppm)

In the compression moulding of PPO powder produced as above, about 1 gram of PPO powder was placed in a mound on a sheet of polytetrafluoroethylene-coated aluminum foil, covered with a second sheet of this same foil and placed between two 4"×5" ferrotype plates. The plates were inserted between preheated (270° C.) platens of a press. The platens were closed without application of significant pressure to the sample. After one minute, 5,000 psi pressure was applied for one minute. The sample was removed, dissolved in toluene, precipitated with methanol and dried at 60° C. for 18 hours in vacuum.

Thus, contrary to indications in the prior art, dimethylamine (b.p. 7.4° C.), which is commercially available as a pure amine in pressurized containers or as an aqueous solution is particularly attractive in the preparation of PPO resin. DMA is much cheaper (less than about one-fifth) than DBA on a mole scale, the reaction rates are not significantly reduced from those obtained with the presently preferred secondary amine, DBA, and a sufficient amount of DMA is lost in the processing of the PPO yielding coupled products that increase the molecular weight, which is indicative of improved impact properties after processing. The overall economic benefit in using DMA in place of DBA would be about a 15-fold reduction in the cost of the secondary amine.

Figure 3:
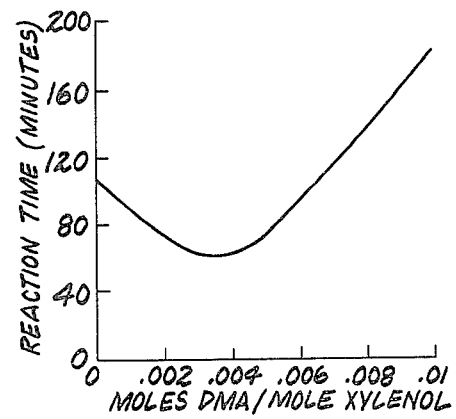
FIG. 3 is a larger scale (i.e. pilot plant) version of the slow monomer addition.

Further, as may be seen from FIGS. 1–3, when monomer is added as a bulk addition, the fastest reaction rates are obtained with DMA additions up to about 30%. When the monomer is added slowly, a similar curve results and optimum rates of reaction are obtained for quantities of DMA ranging from about 10 to about 50%.

What is claimed is:
1. The process for forming polyphenylene ether resin comprising the steps of:
(a) contacting a 2,6-di-substituted phenolic compound with an oxygen-containing gas in the presence of a catalyst, said catalyst comprising a copper compound, a diamine of the formula:

$R^1HN-R^2-NHR^1$ wherein each $R^1$ is independently isopropyl, a $C_{4-8}$ tertiary alkyl or cycloalkyl group having no hydrogens on the alphacarbon atom and $R^2$ is $C_{2-4}$ alkylene or $C_{3-7}$ cycloalkylene; a tertiary amine; a bromine-containing compound selected from the group consisting of hydrogen bromide, alkali metal bromides, alkaline earth metal bromides, 4-bromophenols and mixtures thereof and an amount of dimethylamine, said amount of dimethylamine expressed as the molar ratio of dimethylamine to phenolic compound being in the range of from about 0.001:1 to about 0.01:1, (b) permitting the resulting reaction to proceed for sufficient time to produce polyphenylene ether of at least about 45,000 molecular weight, and (c) recovering said polyphenylene ether.

2. The process as defined in claim 1 wherein the reaction proceeds in the presence of a minor quantity of a quaternary ammonium compound.

3. The process as defined in claim 1 wherein the molar ratio of dimethylamine to phenolic compound is in the range of about 0.0015:1 to about 0.006:1.

4. The process as defined in claim 1 wherein the phenolic compound is in large part added as the reaction proceeds.

5. The process as defined in claim 4 wherein about 10 percent of the phenolic compound is added initially and the balance is added during a period of about 15 to 30 minutes.

6. The process as defined in claim 1 wherein as part of the recovery step the polyphenylene ether is precipitated by the addition of a precipitating agent.

7. The process as defined in claim 6 wherein the precipitating agent is methanol.

8. The process as defined in claim 1 wherein the phenolic compound is 2,6-xylenol.

9. The process as defined in claim 1 wherein the recovered polyphenylene ether is heated to about 270° C. resulting in a significant increase in molecular weight and a significant reduction in nitrogen content.

10. The process for forming polyphenylene ether resin comprising the steps of:

(a) contacting a 2,6-di-substituted phenolic compound with an oxygen-containing gas in the presence of a catalyst, said catalyst initially being free of secondary monoamine content and comprising a copper compound, a diamine of the formula:

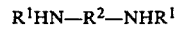

wherein each $R^1$ is independently isopropyl, a $C_{4-8}$ tertiary alkyl or cycloalkyl group having no hydrogens on the alphacarbon atom and $R^2$ is $C_{2-4}$ alkylene or $C_{3-7}$ cycloalkylene; a tertiary amine, and a bromine-containing compound selected from the group consisting of hydrogen bromide, alkali metal bromides, alkaline earth metal bromides, 4-bromophenols and mixtures thereof, (b) permitting the resulting reaction to proceed for sufficient time to produce a first reaction mass comprising low molecular weight polyphenylene ether, water, and residual catalyst, (c) removing water from said first reaction mass, (d) adding a quantity of secondary monoamine to the de-watered first reaction mass to form a second reaction mass, (e) subjecting said second reaction mass to contact with oxygen-containing gas for sufficient time to produce polyphenylene ether of significantly higher molecular weight, and (f) recovering said polyphenylene ether.

11. The process as defined in claim 10 wherein the secondary amine is dimethylamine.

12. The process as defined in claim 11 wherein the amount of dimethylamine expressed as the molar ratio of dimethylamine to phenolic compound is in the range of about 0.001:1 to about 0.01:1.

13. The process as defined in claim 12 wherein the molar ratio of dimethylamine to phenolic compound is in the range of about 0.0015:1 to about 0.006:1.

14. The process as defined in claim 10 wherein as part of the recovery step the polyphenylene ether is precipitated by the addition of a precipitating agent.

15. The process as defined in claim 14 wherein the precipitating agent is methanol.

16. The process as defined in claim 10 wherein the phenolic compound is 2,6-xylenol.

17. The process as defined in claim 10 wherein the recovered polyphenylene ether is heated to about 270° C. resulting in a significant increase in molecular weight and a significant reduction in nitrogen content.

18. The process as defined in claim 10 wherein the low molecular weight polyphenylene ether in the first reaction mass is a mixture having an average molecular weight of about 800.

19. The process as defined in claim 10 wherein the contact of the second reaction mass with oxygen-containing gas takes place in a single reactor.

20. The process as defined in claim 10 wherein the contact of the second reaction mass with oxygen-containing gas takes place in a series of reactors as a continuous process.

* * * * *